June 21, 1932.  W. FERRIS  1,864,126
CLUTCH
Filed Aug. 30, 1929  3 Sheets-Sheet 1

INVENTOR.
WALTER FERRIS.
BY
ATTORNEY.

June 21, 1932.  W. FERRIS  1,864,126

CLUTCH

Filed Aug. 30, 1929  3 Sheets-Sheet 2

INVENTOR.
WALTER FERRIS.

BY

ATTORNEY.

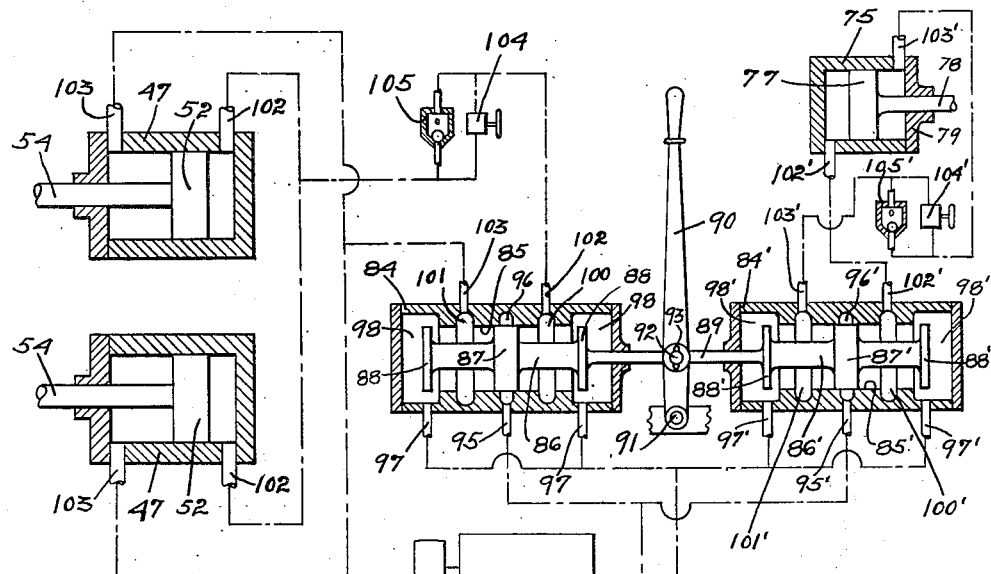
Fig. 4.
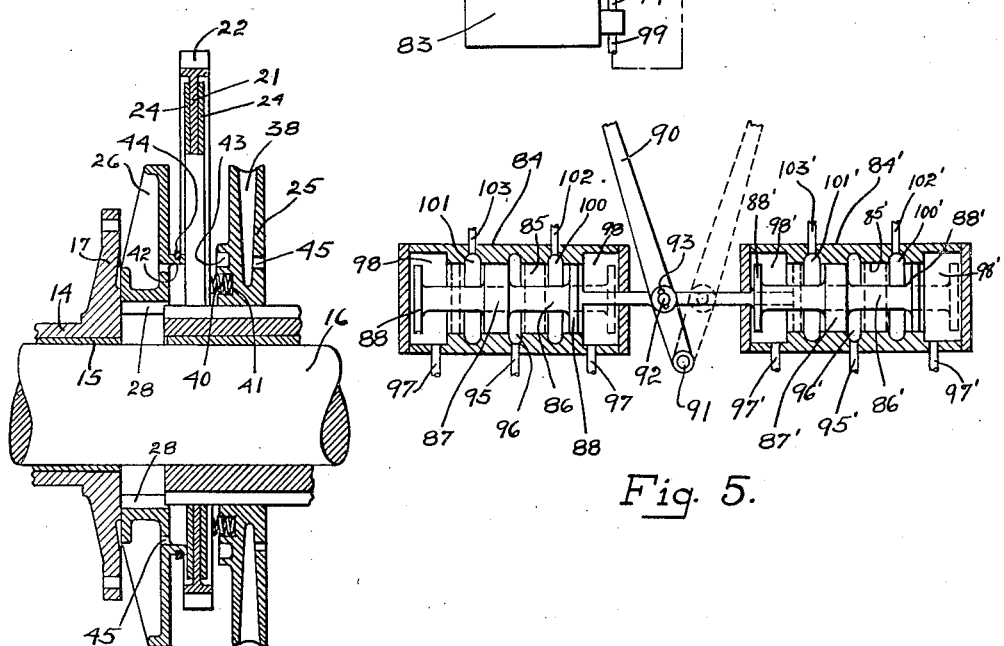
Fig. 5.
Fig. 3.
INVENTOR.
WALTER FERRIS.
BY
ATTORNEY.

Patented June 21, 1932

1,864,126

UNITED STATES PATENT OFFICE

WALTER FERRIS, OF MILWAUKEE, WISCONSIN, ASSIGNOR TO THE OILGEAR COMPANY, OF MILWAUKEE, WISCONSIN, A CORPORATION OF WISCONSIN

CLUTCH

Application filed August 30, 1929. Serial No. 389,336.

This invention relates to clutches.

A general object of the present invention is to improve the construction and operation of fluid actuated clutches.

Fluid operated clutches, as previously constructed, have been operated either by a stationary fluid operated cylinder connected to the clutch parts thru a lever and yoke of some kind, or by one or more fluid operating cylinders mounted with or built into the clutch itself. In the first case the stationary cylinder and the fulcrum for the operating lever both require supports independent of the clutch itself. Such supports having the requisite strength and rigidity are hard to provide and to keep in alignment. On the other hand, when the operating cylinders revolve with the clutch and are mounted upon it, thus avoiding the difficulties just mentioned, it becomes necessary to provide revolving joints in the pipe lines connecting the source of fluid supply to the actuating cylinders. These joints must be concentric with the clutch shaft and must be adequately packed against leakage. These conditions have proved so difficult that hydraulically operated clutches of this type have never been introduced commercially.

One object of the present invention is the provision of a novel combination and arrangement of parts in clutches which will permit the application of non-rotary fluid actuating means thereto in such a manner as to overcome the inherent defects above referred to in fluid actuated clutches as previously designed.

Another specific object is the provision of novel and improved fluid actuated means for operating the clutch.

Another specific object is the provision in a fluid actuated clutch of means for retarding the closure of the clutch to thereby prevent grabbing and at the same time permit prompt opening thereof.

Another object is the provision of a combined fluid actuated clutch and brake under the control of a unitary means by which both are operated substantially simultaneously.

Another object is the provision of an improved fluid control mechanism for a combined clutch and brake which will function to gradually close the clutch or brake selectively and which will permit prompt opening thereof.

Another object is the provision of novel and improved means, in a combination clutch and brake, for automatically actuating the brake mechanism to arrest the motion of the driven parts upon releasing the clutch.

Another object is the provision in a clutch of a new combination and arrangement of parts which will permit accessibility to the clutch parts for inspection and repair without requiring complete dismantling of the clutch or removal thereof from the driving shaft.

Other objects and advantages will appear from the following description of an illustrative embodiment of the present invention.

In the drawings:—

Fig. 3 is a vertical longitudinal section through a portion of the clutch partially disassembled showing mobility of the plates for the purposes of inspection or repair of the friction surfaces of the rings.

Fig. 4 is a diagrammatic showing of the fluid circuit employed to operate the clutch and brake with the control valves shown in neutral position.

Fig. 5 is a longitudinal sectional view through the main control valves shown in Fig. 4 illustrating the characteristic active positions thereof.

Figure 1:
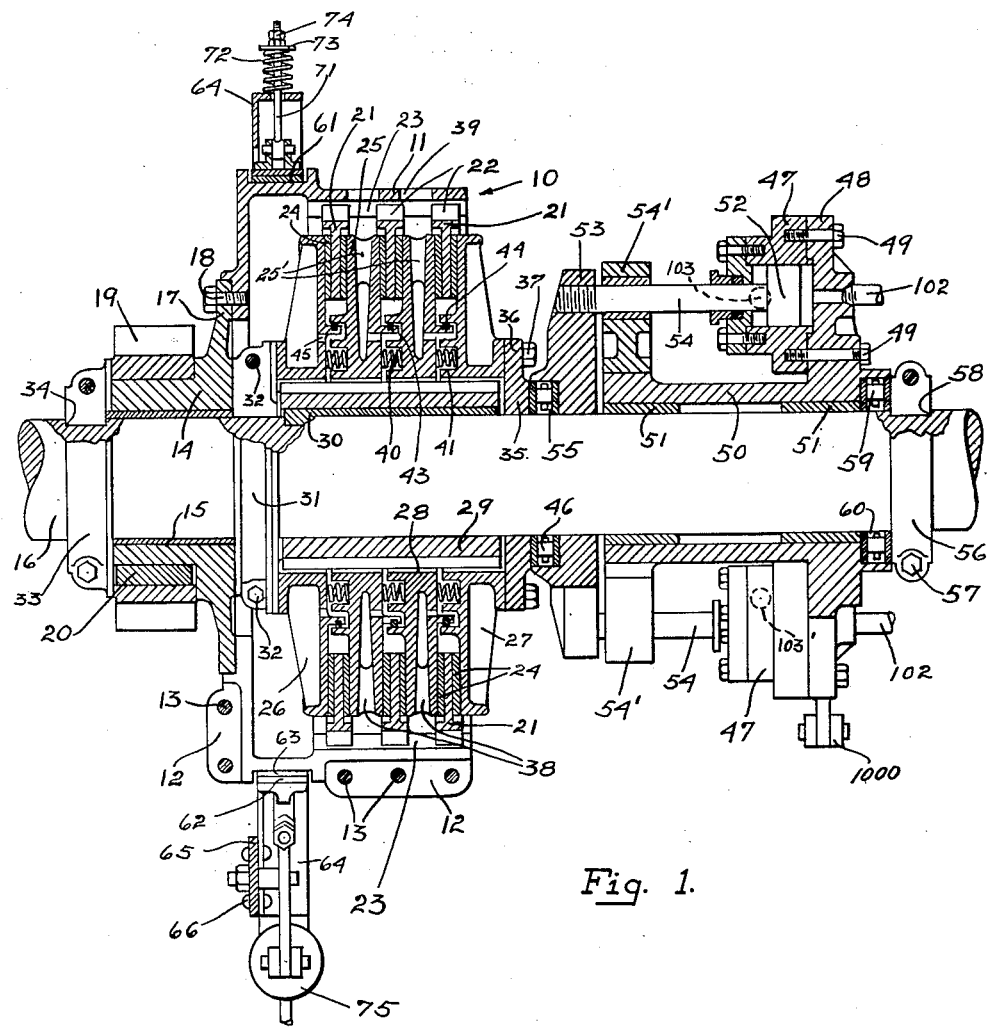
Figure 1 is a vertical longitudinal section through a clutch and associated operating mechanism taken on the line 1—1 of Fig. 2.

In the embodiment of the present invention chosen for illustrative purposes in the accompanying drawings a clutch 10 is shown. The clutch 10 is partially encased in a longitudinally split housing 11. The housing parts are provided with lugs 12 through which bolts 13 pass to secure the housing parts together. A sleeve 14 containing a suitable bearing 15 is mounted freely on a driving shaft 16. One end of the sleeve 14 is provided with a flange 17 to which the split housing 11 is secured by means of bolts 18. The other end of the sleeve 14 is reduced to receive a pinion 19. The pinion 19 is secured to the sleeve 14 by means of a key 20 retained in a suitable keyway.

A plurality of clutch rings 21 are provided with projecting ears 22. These ears engage with slots 23 formed in the inner faces of the housing 11. The ear slot connection between the housing 11 and the rings 21 serves to prevent relative rotation between the housing 11 and rings 21 but permits free axial movement of the rings within the housing. Suitable facing material 24 is applied to each face of the rings 21 in any appropriate manner such as by riveting. The housing 11 and its associated parts hereinabove described form the driven elements of the clutch. The device to be driven through the clutch is provided with a gear (not shown) which meshes with the driving pinion 19.

The following description will serve to identify the driving elements of the clutch 10 which are mounted on the driving shaft 16 and rotate therewith. The driving shaft 16 is driven from a power source in any suitable manner (not shown). Clutch plates 25 in the form of spacer elements are positioned between the faces of adjacent clutch rings 21. End clutch plates 26 and 27 engage the outer faces of the end clutch rings 21. All of the clutch plates are provided with keyways 28 which engage a splined collar 29. The collar 29 is secured to the driving shaft 16 by means of a key 30 to insure the unitary rotation of the clutch plates 25, 26 and 27 with the shaft 16. The engagement between the slots 28 and the splined collar 29 prevents relative rotation between the plates and the collar, but permits free axial movement of the plates upon the splined collar. A ring 31 is preferably diametrically split to permit its ready removal from the driving shaft 16. The two parts of the ring are secured together when in position on the shaft 16 by means of bolts 32. This ring is positioned between the collar 29 and the sleeve 14. The purpose of forming this ring in the above described manner is to facilitate its removal from the shaft 16 for the purpose of permitting axial movement between the plates 25, 26 and 27 to facilitate the inspection and repair of the clutch. The sleeve 14 is positioned between the ring 31 and a similarly formed split ring 33. The driving shaft 16 is provided with a groove 34 which receives the two parts of the ring 33 when they are secured together on the shaft. By virtue of the fact that the split ring 33 is mounted within the groove 34, it will be seen that the entire clutch assembly is retained against axial movement upon the shaft in one direction by virtue of the engagement of the sleeve 14 with the split ring 33. A ring 35 is slidably mounted on the shaft 16 adjacent the outer end of the collar 29. This ring is provided with an outwardly extending flange 36 through which bolts 37 pass to secure the clutch plate 27 to the ring 35.

The purpose of forming the housing 11 of separable parts is to facilitate inspection and repair of the clutch rings 21. Upon removal of the securing bolts 13 and the bolts 18, which serve to permanently mount the housing upon the flange 17 of the sleeve 14, the housing parts may readily be removed from the clutch. After removing the housing 11 the segments of the split ring 31 may be disconnected by the removal of the bolts 32. This operation will permit the removal of the split ring 31 from the shaft 16. The space which was occupied by the split ring 31 will now be available to permit axial movement of the end plate 26 upon the sleeve 29. When the end plate 26 has been withdrawn from the adjacent plates the outer end of the plate will abut the flange 17 of the sleeve 14. It will be seen that the distance between the plate 26 and the spacer plate 25 will be sufficient to permit radial displacement of the clutch ring 21 which lies between these two plates. The ring may then be drawn upwardly as illustrated in Fig. 3 of the drawings, and rotated to inspect the condition of the surface material 24, and to permit repair of the same should it be necessary. Upon repositioning of this ring, the spacer plate 25 may also be withdrawn from the next adjacent plate to permit the succeeding ring 21 to be inspected or repaired. Likewise the process may be continued until the faces of the several clutch rings have been inspected or repaired. The reassembly of the clutch plates and rings merely requires the positioning of the rings with respect to the plates and the application of pressure to the end plate 26 to afford sufficient space for the insertion and fastening of the split ring 31 about the driving shaft 16. The provision of a split housing 11 and the split ring 31 functioning in a manner above described has proven to be a highly advantageous construction for the reason that it permits ready inspection and repair of the clutch plates without necessitating the complete dismantling and removal of the plates and clutch from the driving shaft 16.

Each of the clutch plates 25 is provided with two side walls forming a deep groove 38 which serves to permit the free circulation of air between the acting faces of the spacer elements to cool them. The air is admitted into the housing thru suitable openings 39 formed in a peripheral wall of the same, and is actively circulated by vanes 25' connecting the side walls of each plate and serving both as air fans and as braces between the side walls.

A plurality of coil springs 40 are received within recesses 41 which are spaced around the central opening in the plates 25 and the end plate 27. The contact of these coil springs between the successive clutch plates serves to normally retain them in spaced relationship to permit their free rotation within the housing 11 and between the clutch rings 21. The spacer clutch plates 25 and the end clutch plate 26 are provided with circular flanges 42. These flanges extend laterally from the acting faces of the several plates and are received in grooves 43 formed in adjacent clutch plates. A plurality of piston rings 44 are mounted upon the flanges 42 and engage the outer walls of the grooves 43 to form in effect a seal which prevents the passage of oil or other lubricant into the spaces between the active faces of the clutch plates which engage with the faces of the clutch rings 25 to establish a frictional driving contact for the housing 11. A plurality of vents 45 pass through the wall of the clutch plates and serve as passages through which oil or grease may pass from between the plates to the outside of the plates without coming in contact with the active faces of the plates and rings.

Clutch engaging pressure is transmitted to the collar 35 through an anti-friction bearing 46. The means employed to effect this operating pressure comprises a pair of cylinders 47 which are secured to a non-rotating flange 48 by means of bolts 49. This flange 48 forms an integral part of a sleeve 50 which is provided with suitable bearings 51 whereby the sleeve 50 and all parts attached thereto are supported upon rotating shaft 16. Pistons 52 are positioned within the cylinders 47 and connected to a thrust ring 53 by piston rods 54. These rods 54 are closely fitted in guide brackets or bearings 54' rigidly anchored on the sleeve 50. The thrust ring 53 is provided with a recess 55 within which the anti-friction bearing 46 is mounted. A diametrically split collar 56, the halves of which are secured together by means of bolts 57, is retained upon the driving shaft 16 within a groove 58. This ring 56 together with the ring 33 serve to anchor the clutch and fluid means for actuating the same against axial movement in either direction upon the driving shaft 16. An anti-friction bearing 59 which is housed within a flanged portion 60 of the sleeve 50 serves to prevent frictional drag between stationary sleeve 50 and rotating collar 56. Similarly, bearing 46 prevents frictional drag between the stationary sleeve 50 and rotating flange 35. During the application of the fluid pressure to accelerate the plates 22 outer housing 11 and gear 19 the thrust of pistons 52 forces the end of gear 19 and sleeve 14 against revolving collar 33, which causes friction until the driven parts have been brought up to full speed. Thereafter the sleeve 50 and thrust ring 53, prevented from revolving by link 1000 attached to any convenient stationary anchorage not shown, continuously react axially against the revolving anti-friction bearings 59 and 46 respectively. This holds the revolving clutch plates continuously in engagement to transmit the power, while the fluid operating unit comprising sleeve 50 and associated parts remains stationary requiring no packed or flexible points in the piping between cylinders and source of fluid supply.

Figure 2:
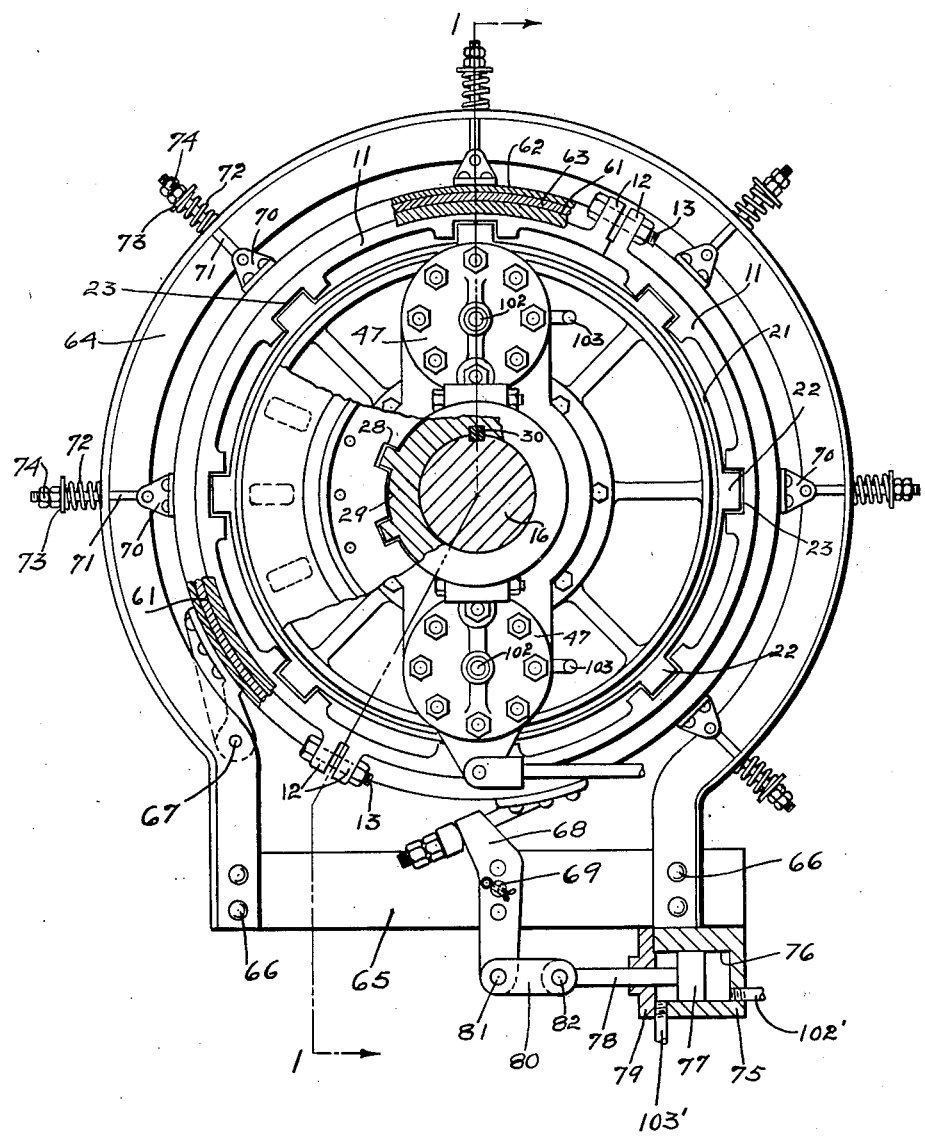
Fig. 2 is a fragmentary end elevational view of the clutch and associated operating mechanism.

A fluid actuated brake mechanism is also shown in conjunction with the clutch 10 (see Fig. 2). A face 61 on the housing 11 serves as a braking surface upon which a brake band 62, having a suitable lining 63, may be applied. The brake band 62 is supported by and within a substantially circular frame 64 rigidly supported by a base member 65. The frame 64 is preferably formed of angle iron, and is permanently mounted on the base member 65 by means of rivets 66. This frame 64 surrounds the housing 11 and is spaced therefrom. The brake band 62 is permanently mounted at one end to the frame 64 through a suitable connection, such as a pin 67. The other end of the brake band 62 is adjustably connected to one end of a lever 68 which in turn is rockably mounted on a pin 69 anchored in the base member 65. A plurality of lugs 70 are mounted in spaced relation about the brake band 62. For the purpose of preventing the brake lining 63 on the band 62 from continually riding upon the brake surface 61, a plurality of rods 71 extend outwardly from the lugs 70 and extend through the frame 64. Coil springs 72 surround these rods and exert pressure upon washers 73 which are retained in place by means of lock nuts 74 on the rods 71. The effect of the action of the coil springs 72 upon the brake band 62 is to normally retain it out of engagement with the face 61 on the housing 11. The means for actuating the brake mechanism comprises a cylinder 75 permanently mounted on the base member 65. A bore 76 in this cylinder receives a piston 77 which is provided with a piston rod 78 extending through a suitable end cap 79 on the cylinder 75. The piston rod 78 is connected to the lower arm of the lever 68 through a suitable link 80 which is rockably mounted on pins 81 and 82 carried by the lever 68 and piston rod 78 respectively.

The clutch and brake mechanisms hereinabove specifically described are simultaneously controlled and operated by a fluid pressure system. In this particular instance, I have chosen to show hydraulic actuating means (see Fig. 4) comprising a pump 83. This pump 83 is a commercial pump manufactured by The Oilgear Company, of Milwaukee, Wisconsin, and is of a variable displacement high pressure type whose displacement is automatically reduced whenever the pressure within the circuit exceeds a predetermined amount. Such a pump is fully described in Patent No. 1,578,233, issued March 23, 1926.

The clutch actuating cylinder 47 and the brake actuating cylinder 75 are individually controlled by separate valves 84 and 84'. Each valve comprises a housing having a bore 85 or 85' therein, containing a plunger 86 or 86'. Each plunger is provided with an intermediate head 87 or 87' and a pair of end heads 88—88 or 88'—88'. The plunger of both valves are connected by a rod 89 for operation in unison. The rod 89 is actuated and controlled by an appropriate lever 90, fulcrumed on a pin 91, and having a slot 93 in which a pin 92 on the rod 89 is engaged.

A supply pipe 94 transmits fluid from the discharge or high pressure side of the pump 83 to each valve 84 or 84' through pipe 95 or 95'. The pipe 95 or 95' is in open communication with a central groove 96 or 96' in the bore 85 or 85' and the direction of flow of fluid supplied to the valve 84 or 84' is under control of the central head 87 or 87'. A pair of pipes 97—97 or 97'—97' respectively which connect the enlarged ends 98—98 or 98'—98' respectively of the bore 85 or 85' exhaust into a pipe 99 which delivers fluid to the intake or low pressure side of the pump 83. A groove 100 or 100' in the bore 85 or 85' lies at one side of the groove 96 or 96' and is spaced therefrom. A similar groove 101 or 101' in the bore 85 or 85' is positioned on the other side of the groove 96 or 96' and similarly spaced therefrom. Pipe 102 or 102' communicates between the groove 100 or 100' on the valve 84 or 84' and one end of the cylinders 47 and cylinder 75 respectively. A similar pipe 103 or 103' communicates between the groove 101 or 101' in the valve 84 or 84' and the other end of the cylinders 47 and the cylinder 75, respectively.

Needle valves 104 and 104' are connected in pipes 102 and 103' respectively. These valves serve to regulate the flow of fluid in one direction through the respective pipes to insure the smooth application of pressure to the clutch and brake elements respectively. Check valves 105 and 105' are bridged across the needle valves 104 and 104' respectively. These valves 105 and 105' serve to effectively prevent the flow of fluid in one direction through the pipes 102 and 103' respectively to insure the passage of the fluid through the needle valves 104 to 104'. When fluid is passing through the pipes 102 and 103' in the reverse direction the valves 105 and 105' respectively serve to permit the free flow of fluid through the pipes to the exclusion of the needle valves 104 and 104' respectively.

When the actuating lever 90 is in the position shown in Fig. 4 neither the clutch or brake mechanism is active since grooves 96 and 96' are blocked by central heads 87 and 87'. Should the operator desire to apply pressure to close the clutch the lever 90 is thrown to the left as illustrated in the full line position of Fig. 5. By this action the central head 87—87' in the valve 84—84' uncovers the groove 96—96' to establish communication between the fluid supply pipe 95—95' and the pipe 102—102' in the working circuit. The fluid in passing through the pipe 102 will meet an obstruction in the form of the check valve 105 and be forced through the needle valve 104 at a metered rate and continue to the clutch actuating cylinders 47 to force the pistons 52 to the left. As the pistons 52 are forced to the left the fluid contained within the left end of the cylinders 47 will be exhausted through the pipe 103 into the groove 101 in the valve 84 which is now in communication with the pipe 97 which directs the fluid back into the intake or low pressure side of the pump 83 through the pipe 99. The forcing of the pistons to the left exerts a pressure on the thrust ring 53 through the piston rods 54. This pressure is transmitted through the anti-friction bearing 46 to the ring 35 and thence to the several clutch plates 25, 26, and 27 to force them into frictional engagement with the faces of the clutch rings 21 to establish a driving connection between the housing 11 which is to be driven and the shaft 16 which is already in motion. Simultaneously with the foregoing action the fluid which has been passed unobstructedly through the pipe 102' is directed to one end of the brake actuating cylinder 75. The action of the fluid within this cylinder tends to force the piston 77 to the right in Fig. 4, or to the left in Fig. 2, to insure against any braking action of the band 62 on the face 61 of the housing 11. As the piston 77 is forced to the right (Fig. 4) the fluid contained in the right end of the cylinder 75 will be discharged through the pipe 103', through the check valve 105' which permits free flow in this direction, into the groove 101' in the valve 84' which is now in communication with the pipe 97' which directs the fluid back to the pump 83 through the pipe 99.

To disengage the clutch and apply braking pressure to the housing 11 the lever 90 is thrown to the right to a position indicated in dotted lines in Fig. 5. By this action the central head 87—87' is moved to the right of the groove 96—96' and establishes communication between the supply pipe 95—95' and the pipe 103—103' in the working circuit. The fluid passing through the pipe 103 will be directed to the left hand ends of the cylinders 47 and force the pistons 52 to the right. This action releases the frictional engagement between the clutch plates 25, 26, 27 and the clutch rings 21 thus breaking the driving connection established in a manner above described. When the pistons 52 are being forced to the right the fluid contained within the right end of the cylinder is free to pass unobstructedly through the pipe 102, the check valve 105 permitting free flow in this direction, into the groove 100 in the valve 84 which is in communication with the pipe 97. The fluid which is simultaneously passing through the pipe 103' will meet an obstruction in the form of the check valve 105' and be forced through the needle valve 104' at a metered rate and continue to the brake cylinder 75 to force the piston 77 to the left in Fig. 4 to apply the brake band 62 to the face 61 on the housing 11 to arrest the rotation of the driven element. As the piston 77 is forced to the left the fluid contained in the left end of the cylinder is discharged through the pipe 102' into the groove 100' of the valve 84' which is in communication with the pipe 97' which directs the fluid back to the intake side of the pump 83 through the pipe 99.

From the foregoing description it will readily be seen that a clutch has been provided which may be actuated by throwing a lever in one direction to effect a driving connection between the clutch element in such a manner as to insure smooth operation of the clutch and simultaneously insure against any braking action on the clutch. By throwing the lever in the opposite direction the driving connection between the clutch elements is broken and simultaneously a controlled braking pressure is applied to smoothly arrest the rotation of the driven housing.

Various changes may be made in the embodiment of the invention hereinabove specifically described without departing from or sacrificing any of the advantages of the invention as defined in the appended claims.

I claim:—

1. In a clutch the combination of a shaft, a plurality of clutch plates rotatable with said shaft and relatively movable axially thereof, a seal between said plates for preventing the escape of lubricant therebetween, a clutch disk interposed between said plates, a member surrounding said disk, driving connections between said disk and member permitting axial movement of said disk relative thereto, and means for effecting relative axial movement between said plates and disk to make and break a clutching engagement therebetween.

2. In a clutch the combination of a shaft, a plurality of clutch plates rotatable with said shaft and relatively movable axially thereof, a seal between successive plates for preventing the escape of lubricant therebetween, clutch disks between successive plates, a member surrounding said disks, driving connections between said disks and member permitting axial movement of said disks relative thereto, and means for effecting relative axial movement between said plates and disks to make and break a clutching engagement therebetween.

3. In a clutch the combination of a shaft, a plurality of clutch plates rotatable with said shaft and relatively movable axially thereof, a seal between said plates for preventing the escape of lubricant therebetween, lubricant drain passages in said plates, a clutch disk between said plates, a member connected in driving relation with said disk, and means for effecting relative movement between said plates to make and break a clutching engagement between said plates and disk.

4. In a clutch the combination of a shaft, a pair of clutch plates rotatable with said shaft and relatively movable axially thereof, overlapping flanges on said plates, a packing ring between said flanges coacting therewith to provide a lubricant seal, lubricant drain passages in said plates, a clutch disk between said plates, a member connected in driving relation with said disk, and means for effecting relative movement between said plates to make and break a clutching engagement between said plates and disk.

5. The combination of a shaft, a plurality of clutch plates thereon and connected in driving relation therewith, a plurality of disks respectively interposed between successive plates for clutching engagement therewith, a member rotatable on said shaft and connected in driving relation with said disks, a brake for said member, fluid actuated means for effecting relative axial movement between said clutch plates and disks to make and break clutching engagement therebetween, non-rotatable means on said shaft for supporting said fluid actuated means, a second fluid actuated means for operating said brake, and means for controlling both of said fluid actuated means.

In witness whereof, I hereunto subscribe my name this 15th day of August, 1929.

WALTER FERRIS.